United States Patent [19]

Niggemann

[11] Patent Number: 4,603,732
[45] Date of Patent: Aug. 5, 1986

[54] HEAT MANAGEMENT SYSTEM FOR SPACECRAFT

[75] Inventor: Richard E. Niggemann, Rockford, Ill.

[73] Assignee: Sundstrand Corporation, Rockford, Ill.

[21] Appl. No.: 578,475

[22] Filed: Feb. 9, 1984

[51] Int. Cl.[4] .................. F28D 15/00; B64G 1/50
[52] U.S. Cl. .......................... 165/41; 165/104.25; 165/104.27; 415/89; 415/88; 244/163
[58] Field of Search ............ 165/104.25, 104.27, 165/41; 415/88, 89; 123/41.2–41.26

[56] References Cited

U.S. PATENT DOCUMENTS

| | | |
|---|---|---|
| 1,994,948 | 3/1935 | Grasso . |
| 2,443,518 | 6/1948 | Rushmore ..................... 123/41.23 |
| 2,477,932 | 8/1949 | King . |
| 2,787,889 | 4/1957 | Swank . |
| 2,825,317 | 3/1958 | Tacchella et al. ............. 123/41.23 |
| 2,925,722 | 2/1960 | Blackburn et al. . |
| 2,944,409 | 7/1960 | Chausson . |
| 3,022,643 | 2/1962 | Schueller . |
| 3,062,148 | 11/1962 | LeBel . |
| 3,086,372 | 4/1963 | Barger et al. . |
| 3,239,164 | 3/1966 | Rapp . |
| 3,255,805 | 6/1966 | Bechard . |
| 3,559,879 | 2/1971 | Bechard . |
| 3,608,326 | 9/1971 | Leonard, Jr. ................... 415/89 |
| 3,608,329 | 9/1971 | Bell, Jr. ........................ 415/89 |
| 4,014,179 | 3/1977 | Iles et al. . |
| 4,261,177 | 4/1981 | Sterlini . |
| 4,273,304 | 6/1981 | Frosch et al. . |

Primary Examiner—Albert W. Davis, Jr.
Attorney, Agent, or Firm—Wood, Dalton, Phillips, Mason & Rowe

[57] ABSTRACT

A heat management system especially adapted for spacecraft including a first heat exchanger in heat exchange relation with a sink having a widely varying temperature and a second heat exchanger in heat exchange relation with a variable heat load. An equilibrator is provided to maintain respective bodies of heat exchange fluid in the liquid state and in the gaseous state. A first flow path is provided for circulating a mixture of liquid phase fluid and gaseous phase fluid from the equilibrator to the first heat exchanger and return fluid from the first heat exchanger to the equilibrator. A second flow path circulates liquid phase fluid from the equilibrator to the second heat exchanger and returns fluid therefrom to the equilibrator.

16 Claims, 2 Drawing Figures

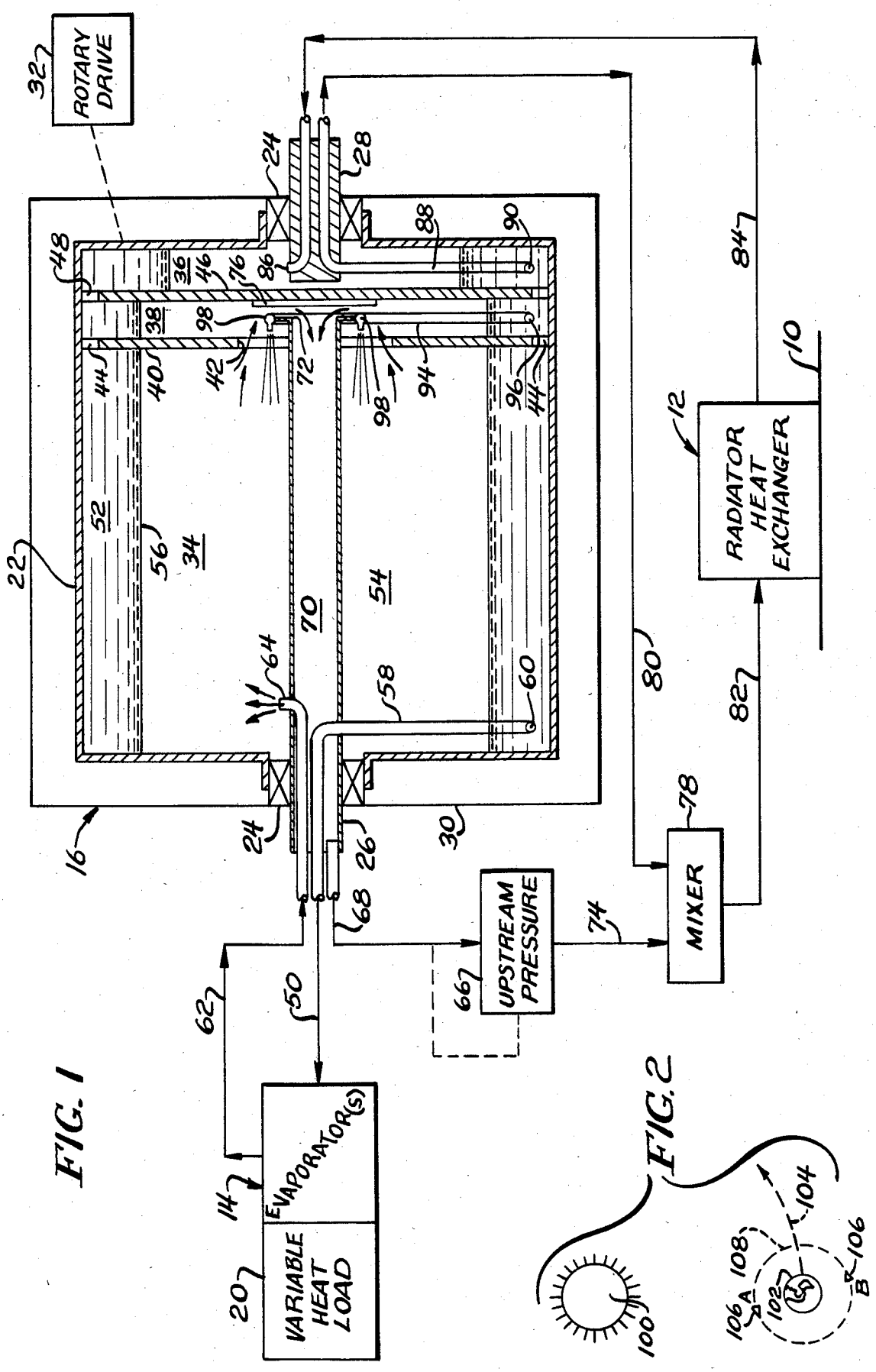

HEAT MANAGEMENT SYSTEM FOR SPACECRAFT

FIELD OF THE INVENTION

This invention relates to a heat management system for use with a variable heat load in an environment having large fluctuations in sink temperature as, for example, in spacecraft.

BACKGROUND OF THE INVENTION

Spacecraft that generate and utilize large quantities of power require heat management systems to absorb heat from the heat generating sources, transport the heat over some distance to a waste heat radiator and then radiate the heat into space. Currently, such systems utilize pumped liquid for cooling and heat transport. Such systems, however, suffer from high electrical power consumption typically amounting to approximately 10% of the thermal power transported, and a substantial temperature change in the liquid is required to absorb the heat which thus lowers the average temperature of the liquid at the waste heat radiator. This in turn necessitates a larger waste heat radiator. Thus, such systems, while effective for their intended purpose, have substantial drawbacks when employed in spacecraft, namely, relatively high power consumption in an environment where power generating capability is necessarily restricted due to weight concerns, and the need for large radiators in an environment where both size and weight are of substantial concern.

To overcome these difficulties, there has been proposed a two phase heat management system which dissipates heat from the heat load by evaporating a liquid and rejects heat by condensing the vapor. Such a system can transport heat with no substantial temperature drop between the head load and the waste heat radiator. Much less pumping power is required in such a system because the mass flow rate of liquid/vapor is substantially less than for a pumped liquid system. This is due to the fact that the heat of vaporization of the liquid is large in comparison to the relatively small sensible heat transferred to a liquid stream with a reasonable temperature differential. The lesser mass flow rate and the higher temperature differential between condensing vapor and sink temperature obtainable in such a system minimize radiator size.

In one such system, evaporators are placed in heat exchange relation with the heat load and are provided with a heat exchange fluid in the liquid phase by conventional centrifugal pumps. Vapor or a liquid/vapor mixture emanating from the evaporators is in part fed through a radiator and in part bypassed about the radiator to be merged again at a mixing valve downstream from the radiator. The degree of mix and flow is controlled by setting a desired temperature for the system and the output of the mixing valve, after the two streams are thoroughly mixed, is inputted to a constant pressure accumulator which in turn is connected to the inlet of the centrifugal pump. In the typical case, the fluid in the accumulator is maintained slightly below saturation at a temperature and pressure consistent with temperature control requirements of the heat load. If the liquid is not in a slightly subcooled state at the pump input, cavitation may occur resulting in system failure. For when the pump cavitates, it will provide no fluid to the evaporators with the consequence that they will cease generating vapor. The radiator heat load will then likewise vanish for with no vapor to condense, the radiator will tend to fall in temperature toward sink temperature. This will result in a lower vapor pressure in the evaporators and in the vapor space in the radiator. This in turn will cause the accumulator to expel liquid which will flow backwardly through the mixer to fill the vapor space in the radiator until pressure equilibrium is reestablished in the system at a lower pressure level. The lowering of the pressure level at the accumulator results in less subcooling of the liquid in the accumulator which in turn increases the tendency of the pump to cavitate. It is considered that control errors of as little as 3% at the mixing valve can bring about a situation where cavitation is prone to occur.

Such a system also lacks adequate turn down capability, that is, the ability to rapidly respond to considerable reductions in the heat load at the evaporator. In spacecraft, it is highly desirable to maintain the heat sources or loads, frequently electronic gear, at a tightly controlled constant temperature and in a two phase heat management system, system pressure is determinative of the temperature at which the liquid evaporates in the evaporators responsible for maintaining the heat load at the desired temperature.

Also of concern is the heat load at the radiator. As is well known, the sink temperature to which the radiator is exposed varies greatly dependent upon the relationship of the spacecraft relative to, for example, the sun and the earth. When a spacecraft is orbiting the earth and is between the earth and the sun, a typical design temperature for the sink temperature would be approximately 385° R.

Conversely, when the earth is interposed between the orbiting spacecraft and the sun, the sink temperature may descend to as low as 150° R. or lower.

In the situation where the evaporator heat load decreases and sink temperature is decreased, a system such as described previously will tend to condense and greatly subcool the fraction of the flow passing from the evaporator to the mixing valve, the degree being dependent on wink temperature. The bypass fraction intended to mix with the subcooled fraction from the radiator and warm it to a temperature slightly below the saturation temperature of the heat exchange fluid being employed may not accomplish the same, either because of lesser sensible heat in the bypass fraction due to decreased heat load or because of insufficient sensible heat because of the greatly reduced temperature of the condensate due to decreased sink temperature, or both. The subcooled temperature of the heat exchange fluid passing through the condenser is, of course, limited by the freezing temperature of the fluid employed and in the situation described, fluid freeze up can occur resulting in system failure. Thus such a system cannot reliably cope with the shedding of heat load or large fluctuation in sink temperature.

Analysis of a system such as described, where ammonia is employed will show that such a system has virtually no turndown capability for the varying sink temperature encountered by spacecrft, that is, that the minimum heat load for which the system will remain operative during the low sink temperature exposure is almost equal to the design heat load.

In a two phase system as described, a fixed mass of gas fills a volume on one side of a bellows in the accumulator while the heat exchange fluid fills the other side. As pressure level in the system decreases, the pressure of the fixed gas mass in the accumulator urges the bellows to expel liquid on its opposite side into the system. The volume of gas required to drive the bellows is, of course, related to the allowable change in system pressure level necessary to accomplish the desired expulsion.

Because, as mentioned previously, evaporating temperature, and thus temperature control of the heat load, is dependent upon system pressure, where close control is required, system pressure changes must be held to a minimum. Thus, the volume of the fixed mass of gas in the accumulator must be quite large in comparison to the volume of liquid that can be expelled from the accumulator in order to maintain substantially constant system pressure. Consequently, to maintain tight temperature control, the accumulator in such systems must be made quite large and the resulting size and weight are highly undesirable in spacecraft. Conversely, if the size and weight of the accumulator is decreased, sensitive and accurate temperature control of precision components such as electronics is degraded, which is likewise undesirable.

The present invention is directed to overcoming one or more of the above problems.

SUMMARY OF THE INVENTION

It is the principal object of the invention to provide a new and improved heat management system for use with variable heat loads in environments having large fluctuations in sink temperatures as, for example, in spacecraft.

An exemplary embodiment of the invention, according to one aspect thereof, achieves the foregoing object in a system including a first heat exchanger which is adapted to be in heat exchange relation with a sink having widely varying temperatures. Also included is a second heat exchanger which is adapted to be in heat exchange relation with a variable heat load. The system employs an equilibrating means for maintaining respective bodies of heat exchange fluid in the liquid state and in the gaseous state and first flow path means are provided for circulating a mixture of liquid phase fluid and gaseous phase fluid from the equilibrating means to the first heat exchanger and returning fluid from the first exchanger to the equilibrating means. The system is completed by a second flow path means for circulating liquid phase fluid from the equilibrating means to the second heat exchanger and for returning fluid therefrom to the equilibrating means.

In a highly preferred embodiment, the second heat exchanger is an evaporator and the system further includes means for maintaining the equilibrating means at a substantially constant pressure.

According to another facet of the invention, the system includes first and second heat exchangers as before along with means which include a pump for circulating a heat exchange fluid in a flow path including the heat exchanger. A mixer is disposed in the flow path upstream of the first heat exchanger for receiving heat exchange fluid in both a liquid phase and in a gaseous phase, the latter as a substantially saturated vapor from a stabilizing means, to mix the two phases prior to their entry into the first heat exchanger. The stabilizing means is operative to receive heat exchange fluid in either the gaseous or liquid phase and in a combined liquid and gas phase and to provide heat exchange fluid to the second heat exchanger in the liquid phase substantially at saturation.

In a preferred embodiment, the pump and the stabilizing means are disposed in a single housing.

This facet of the invention also contemplates the stabilizing means may receive the heat exchange fluid in the liquid phase below saturation from the first heat exchanger and includes further provision for means for adding heat to the heat exchange fluid in the liquid phase below saturation.

In a highly preferred embodiment, the stabilizer includes a vapor space for the heat exchange liquid in the gaseous phase and the heat adding means mentioned in the preceding paragraph comprises means for spraying the heat exchange fluid in the liquid phase below saturation into the vapor space. The resulting condensation of vapor on the cold liquid adds heat to the latter.

According to still another facet of the invention, there is provided a heat management system for use in spacecraft wherein a first heat exchanger, as before, is adapted to radiate heat into space and a second heat exchanger, as before, is provided for transferring heat from a variable heat load on the spacecraft. Means are provided for regulating fluid flow in a fluid flow path including the heat exchangers and there is provided a pump forming part of the flow path which is in the form of a rotary drum driven about an axis at a sufficient speed to cause fluid therein to rotate and the liquid phase to move radially outwardly and form an annular body of rotating liquid fluid surrounding a body of gaseous fluid within the drum. A stationary pitot tube liquid pickup having an inlet in the body of liquid fluid is provided, said inlet being pointed in the direction opposite of the fluid rotation.

Other objects and advantages of the invention will become apparent from the following specification taken in connection with the accompanying drawings.

DESCRIPTION OF THE DRAWINGS

FIG. 1 is a mechanical and diagramatic view of the heat management system made according to the invention shown in somewhat schematic form; and FIG. 2 is a schematic illustrating various positions of a spacecraft relative to a body being orbited which in turn is orbiting a star such as the sun.

DESCRIPTION OF THE PREFERRED EMBODIMENT

An exemplary embodiment of a heat management system made according to the invention is illustrated in FIG. 1 in the environment of a spacecraft having an exterior skin 10. The heat management system itself includes four major components including a first heat exchanger, generally designated 12, a second heat exchanger 14, an equilibrating means or stabilizer, generally designated 16 and miscellaneous flow conduits, pumps (pitot tubes) and other components to be described in greater detail hereinafter.

With reference to the first heat exchanger 12, in a space environment, which is nearly a perfect vacuum, heat exchange cannot occur by conduction or convection. Thus, the first heat exchanger 12 is in the form of a radiator arranged in conjunction with the spacecraft skin 10 so as to radiate energy to space. Because the invention contemplates the use of a heat exchange fluid that at various times exists in one or the other or both of the liquid phase and the gaseous phase, the radiator 12 is also such as to be capable of condensing gaseous phase fluid to a liquid phase fluid.

The second heat exchanger 14 will typically comprise one or more evaporators in heat exchange relation with a variable heat load 20. Typically, the heat load 20 may comprise electronic equipment that may be turned on or turned off or consume varying amounts of power depending upon the functions being performed at a given point in time. In order to produce the reliability required in spacecraft, it is highly desirable to maintain such components at essentially a constant temperature. Thus, by providing the evaporator 14 with heat exchange fluid in the liquid phase at saturation, i.e., its boiling point for the pressure of the system, and by maintaining the system pressure constant, the sink temperature at the variable heat load may be made constant and equal to the boiling point of the heat exchange liquid utilized. In this regard, a typical heat exchange fluid employed is ammonia ($NH_3$). It will, of course, be appreciated that while the extraction of heat from the variable heat load 20 is the principal function of the evaporator 14, the latter might also supply heat to the variable heat load when the same has a temperature less than the boiling point of the heat transfer fluid used to attempt to assure constant temperature of the variable heat load 20 even in this occurrence.

The stabilizer or equilibrating means 16 is perhaps more aptly referred to by the latter term since its purpose is to establish equilibrium between heat exchange fluid in the gaseous or vapor stage and heat exchange fluid in the liquid phase at substantially the desired sink temperature at the evaporator 14 which, as mentioned previously, is controlled according to this invention by controlling system pressure. When the present invention is applied to spacecraft, where a zero gravity condition will exist when the spacecraft is in orbit, the equilibrating means 16 is provided with components which also constitute pumps for circulating the heat exchange fluid in the liquid phase and will become apparent from the following.

The equilibrating means 16 includes a drum 22 mounted for rotation by bearings 24 on stationary axles 26 and 28 within a housing 30. A rotary drive unit 32 is provided to rotate the drum 22 to provide pumping action as will be seen.

The interior of the drum 22 is divided into three chambers, the first being designated 34, the second being designated 36, and the third being designated 38. The third chamber 38 resides between the first chamber 34 and the second chamber 36 and is defined by a radially inwardly directed plate 40 extending from the inner periphery of the drum 22 toward the axle 26. At its radially inner periphery, the plate 40 includes an enlarged central opening 42. At its radial outer periphery, the plate 40 includes a series of small openings 44 by which fluid communication to the first chamber 34 is established at the radially outer portion thereof.

The second chamber 36 is separated from the chamber 38 by a substantially solid plate 46 extending across the interior of the drum 22. However, at its radially outer periphery, the plate 46 is provided with a series of small openings 48 by which fluid communication to the third chamber 38 at its radially outer extremity is established.

In the first chamber 34, equilibrium conditions between the heat exchange fluid in both the gaseous phase and the liquid phase are established. Conversely, heat exchange fluid at a temperature below saturation will be present in the second chamber 36. By reason of the passages 44 and 48, heat exchange fluid in the liquid phase from both the chambers 34 and 36 will be received and mixed such that the temperature of the heat exchange fluid in the liquid phase within the chamber 38 will be at somewhat less than the saturation temperature but at a temperature greater than that of the liquid phase fluid in the chamber 36. By reason of the presence of the central opening 42, gaseous phase fluid flows into the chamber 38 from the chamber 34 and will be at saturation.

As mentioned previously, liquid phase fluid at saturation is to be applied to the evaporator 14. This is accomplished by means of a pump which pumps liquid phase fluid from the chamber 34 via a conduit shown schematically at 50 to the evaporator. The rotary mounting of the drum 22 and the provision of the rotary drive 32 form essential elements of a pump when the invention is employed in zero gravity conditions. In particular, the rotary drive 32 rotates the drum 22 at a sufficiently rapid rate that centrifugal force causes liquid phase fluid to move radially outwardly within the drum to embrace its inner periphery thereby defining an annular body of liquid phase fluid 52. This body of fluid surrounds a vapor space 54 occupied by gaseous phase heat exchange fluid. Within the chamber 34, equilibrium of the two phases will be present at their interface 56. Virtual equilibrium conditions will exist elsewhere in the chamber 34.

To achieve the pumping action required, the axle 26 mounts a radially extending probe-like conduit 58 which terminates in a circumferentially directed inlet 60 opening in the direction opposite the direction of rotation of the drum 22 and located well within the body of liquid phase fluid 52. Because the axle 26 is stationary, rotation of the drum 22 will cause ram-like induction of the liquid phase fluid constituting the body 52 into the probe 58 through the inlet 60. The probe 58 is connected to the conduit 50 with the result that liquid phase fluid that is subcooled with respect to the vapor in 54 only by virtue of the pump pressure rise will be provided to the evaporator 14.

In the usual case, some of the liquid phase fluid in the evaporator 14 will be evaporated therein absorbing heat from the variable heat load 20. The degree of such vaporization will, of course, depend upon the heat load. The greater the amount of heat being generated in the heat load 20, the greater degree of vaporization. In general, it is desirable to design the system so that while the vast majority of the liquid phase fluid may be converted to the vapor phase in the evaporator 14, at no time is all of the liquid phase fluid evaporated since this could result in super heating of the vapor with the consequence that the temperature of the variable heat load 20 could greatly exceed saturation temperature due to the drastically lower heat transfer coefficient associated with vapor flow.

In general then, heat exchange fluid from the evaporator 14 will emerge in a mixed gaseous and liquid phase. This emerging fluid is returned by a conduit 62 which extends into the axle 26 to be returned via a port 64 to the vapor space 54 in the first chamber 34. The liquid phase portion of the incoming fluid will migrate, due to inertia and centrifugal force, to the liquid phase body 52 while the vapor phase portion of the incoming fluid will fill the vapor space 54. It will, of course, be appreciated that the incoming fluid, being a mixture of gaseous and liquid phases will be at equilibrium, i.e., saturation, at the time of entry into the chamber 34.

To maintain a constant pressure within the equilibrating means 16, an upstream pressure regulator 66 is provided. The pressure regulator is in fluid communication via a line 68 with the hollow interior 70 of the axle 26. The interior of the axle 26 opens to the radially inner portion of the third chamber 38 as indicated at 72. This is in turn in fluid communication with the vapor space 54 in the first chamber through the central opening 42 in the plate 50.

As a consequence, gaseous phase fluid in the vapor space 54 may exit the same through the hollow interior 70 of the axle 26 to the pressure regulator 66. Whenever the pressure within the equilibrating means 16 exceeds the desired system pressure which, of course, controls the saturation temperature at which liquid phase fluid is provided to the evaporator 14, the pressure regulator 66 vents the excess pressure on a line 74. To assure that dry vapor only is vented to the pressure regulator 66, the plate 48 may advantageously mount a demister 76 of any conventional configuration in the area of the opening 72 to assure that any liquid phase fluid in small droplets or mist form is captured. The demister 76 will, of course, return such liquid phase fluid to the interior of the third chamber 38.

The line 74 from the pressure regulator 66 provides gaseous phase fluid to a mixer 78. As will be seen, the mixer 78 also receives liquid phase fluid on a line 80 which is at a temperature less than saturation. The gaseous phase and liquid phase fluids are mixed within the mixer 78 with the subcooled liquid phase fluid serving to partially condense a quantity of the gas phase fluid. The mixture is fed on a line 82 to the radiator 12 whereat complete condensation occurs. In the usual case, there will be some subcooling of the condensed liquid below the saturation temperature of the system, the degree of which will depend upon the sink temperature, that is, in the case of spacecraft, the temperature exterior of the spacecraft skin 10.

Condensed fluid, typically subcooled below saturation temperature, exits the radiator 12 on a line 84 and is inputted via a port 86 in the axle 28 to the second chamber 36. Because such liquid is subcooled, and may be substantially subcooled, it is not admitted directly into the first chamber 34 where equilibrium conditions exist.

The axle 28 also mounts a radially extending probe-like conduit 88 which terminates in a circumferentially directed inlet 90 opening oppositely of the direction of rotation of the drum 12 and well below the minimum contemplated liquid level within the chamber 36. Thus, the probe 88 and inlet 90 define a pump for the contents of the chamber 36 and as seen in FIG. 1, the same is connected to the line 80 to provide liquid phase fluid to the mixer 78 as mentioned previously.

Some of the subcooled liquid phase fluid received in the second chamber 36 is admitted to the third chamber 38 via the openings 48. In the third chamber 38, such subcooled liquid phase fluid is mixed with liquid phase fluid at saturation which enters the third chamber 38 through the openings 44. By this mixing process, the subcooled liquid phase fluid from the chamber 36 is warmed toward saturation temperature.

To precude subcooled liquid phase fluid from the chamber 36 from entering the first chamber 34 by passage through the openings 48 and 44, the liquid phase body of fluid existing in the third chamber 38 is constantly being pumped out of such chamber during rotation of the drum 22, again by a radially extending probe-like conduit 94 terminating in a circumferentially directed inlet 96 below the liquid level. The pump thus defined is connected to a series of spray nozzles 98 mounted on the axle 26 which atomize and spray the liquid into the vapor space 54 within the first chamber 34. To the extent that the liquid droplets thus sprayed are at a temperature less than saturation, their being subject to the vapor in the vapor space 54 causes condensation of the vapor on the droplets. Such condensation, in turn, provides heat from the condensing vapor to the liquid droplets raising the temperature of the latter to the saturation temperature. Centrifugal force generated by rotation of the drum 22 in turn causes the droplets to migrate to the annular body 52 of liquid phase fluid within the chamber 34. Thus, because of this unique arrangement of components, even drastically subcooled liquid phase fluid entering the equilibrating means 16 does not disturb equilibrium conditions in the first chamber 34 from which liquid phase fluid at saturation is taken to be applied to the evaporators 14.

The system provides excellent turn down capability. In the event of a drastic drop in the heat load, the amount of vapor being returned on line 62 to the vapor space 54 will commensurately decrease. This in turn will cause a decrease in the tendency to build up system pressure within the first chamber 34 and a lesser quantity of vapor will be fed to the radiator 12 via the pressure regular 66 and the mixer 78. As a consequence, the volumetric flow rate through the radiator 12 will decrease drastically as such vapor as reaches the radiator 12 condenses in a virtual collapse. In the proposed two phase system as mentioned previously, this could result in the heat fluid freezing in the radiator halting system operation. However, by reason of the unique connections of the radiator and mixer to the second chamber 36, a decrease in pressure in the radiator 12 due to such collapsing condensation of vapor will result in heat exchange fluid within the chamber 36 being drawn by the decreased pressure in the radiator to the radiator to fill the void and maintain sufficient flow to the radiator to prevent freeze up.

Similarly, when drastic changes in the sink temperature for the radiator 12 occur, a similar action takes place. Those skilled in the art of heat management systems for spacecraft will readily appreciate that the sink temperature of the radiator will vary substantially depending upon the relationship of the spacecraft to a radiating body and other objects. As seen in FIG. 2, one such radiating body might be the sun 100 and an object might be considered to be the earth 102 orbiting the sun 100 as illustrated by an arrow 104. In the assumed case, the spacecraft is shown at 106 in an orbit 108 about the earth 102. In the position labeled A, the spacecraft 106 is between the earth 102 and the sun 100 and the sink temperature may be relatively high, as for example, 385° R. Conversely, when the spacecraft reaches that point in its orbit whereat the earth 102 is interposed between the spacecraft 106 and the sun 100, shown as point B, the sink temperature may decrease to 150° R.

Thus it can be appreciated that a rapid change in sink temperature, as when the spacecraft 106 passes from a position exposed to the sun 100 to a position such as shown at position B in FIG. 2 can cause a similar collapse-like condensation of vapor in the radiator 12 even though the heat load at the evaporator 12 is maintained constant. Yet, the system will react in the same way as specified previously when a portion of the heat load is shed, thereby preventing freeze up in the radiator 12.

It will also be appreciated from the foregoing that the unique pumping system employed in a heat management system made according to the invention is incapable of cavitation. Thus, the sequence of events associated with cavitation in the proposed system mentioned previously is completely avoided.

It will also be appreciated that a heat management system made according to the invention does not require a large volume accumulator in order to maintain system pressure, and thus sink temperature at the evaporator 14, constant. The level of liquid phase fluid within the chamber 34 may vary over considerable limits without appreciably changing the saturation temperature of the liquid phase fluid applied to the evaporator 14 via the line 50.

It will also be appreciated that because the system operates utilizing the heat exchange fluid in two phases, the size and weight of the radiator 12 may be substantially decreased from the prior art radiators.

This same feature minimizes power consumption for pumping purposes because of the lesser mass flow rate required.

What is claimed is:

1. A heat management system for use with a variable heat load in an environment having large fluctuations in sink temperature;
   a first heat exchanger adapted to be in heat exchange relation with said heat sink;
   a second heat exchanger adapted to be in heat exchange relation with said variable heat load;
   means, including a pump, for circulating a heat exchange fluid in a flow path including stabilizing means in said flow path for receiving the heat exchange fluid in one or more of (a) a gaseous phase, (b) a liquid phase, and (c) a combined liquid-gas phase, and for providing the heat exchange fluid to said second heat exchanger in the liquid phase substantially at saturation;
   a mixer in said flow path upstream of said first heat exchanger for receiving heat exchange fluid in (a) a liquid phase, and (b) in the gaseous phase as a substantially saturated vapor from said stabilizing means and for mixing said phases prior to entry into said first heat exchanger.

2. The heat management system of claim 1 further including means in said flow path for supplying heat exchange fluid in the gaseous phase at a substantially saturated vapor to said mixer at a substantially constant pressure.

3. The heat management system of claim 1 wherein said pump and said stabilizing means are disposed in single housing.

4. The heat management system of claim 1 wherein said stabilizing means may receive the heat exchange fluid in the liquid phase below saturation from said first heat exchanger and further includes means for adding heat to said heat exchange fluid in the liquid phase below saturation.

5. The heat management system of claim 4 wherein said stabilizer includes a vapor space for the heat exchange liquid in the gaseous phase and said heat adding means comprises means for spraying said heat exchange fluid in the liquid phase below saturation into said vapor space.

6. The heat management system of claim 5 especially adapted for use in zero gravity conditions wherein said pump and said stabilizing means are defined by a rotary drum.

7. A heat management system for use in an environment having large fluctuations in sink temperature to which a first heat exchanger is exposed and for providing temperature control to a variable heat load in heat exchange relation with at least one second heat exchanger utilizing a heat exchange fluid existing in gaseous and/or liquid phase comprising:
   a mixer for receiving said fluid in both gaseous and liquid phases, mixing the same and directing the resulting fluid to the first heat exchanger
   an equilibrating means for
   (a) receiving said fluid in the liquid phase from the first heat exchanger,
   (b) providing said fluid in the liquid phase for said mixer,
   (c) providing said fluid in the gaseous phase for said mixer,
   (d) maintaining separate bodies of fluid in the gaseous phase and in the liquid phase at substantial saturation so that the liquid phase body may be directed to the second heat exchanger, and
   (e) receiving return fluid from the second heat exchanger; and
   means for moving the fluid through said system;

8. The heat management system of claim 7 wherein said separate bodies interface within a single chamber forming a portion of said equilibrating means having a vapor space for the gaseous phase and a liquid space for the liquid phase; and means for regulating the pressure in said vapor space.

9. The heat management system of claim 8 wherein means are provided for recirculating part or all of the fluid in the liquid phase received by said equilibrating means from the first heat exchanger to said mixer and means for heating and introducing any such liquid not recirculated into said chamber.

10. The heat management system of claim 9 wherein said heating and introducing means includes means for spraying such liquid into said vapor space.

11. The heat management system of claim 7 wherein said equilibrating means comprises first and second chambers, said first chamber constituting the equilibrating means for (c), (d) and (e) and said second chamber constituting said equilibrating means for (a) and (b), said equilibrating means further including means for heating and introducing liquid into said first chamber from said second chamber.

12. The heat management system of claim 11 wherein said heating and introducing means comprises a third chamber in fluid communication with the liquid phase body portion of said first chamber and with said second chamber, and in which mixing of the liquid phases of both said first and second chambers may occur, and a spray system for spraying the liquid phase in said third chamber into the gaseous phase body portion of said first chamber.

13. A heat management system for use in spacecraft or the like comprising a first heat exchanger of the radiator type for radiating heat into space;
   a second heat exchanger for transferring heat from a variable heat load on a spacecraft;
   means for establishing a heat exchange fluid flow path between said heat exchangers;
   means for regulating fluid flow in said flow path; and
   a pump forming part of said flow path comprising a rotary drum driven about an axis at sufficient speed to cause fluid therein in the liquid phase to move radially outwardly and form an annular body of liquid fluid surrounding a body of gaseous fluid with said drum, and a liquid pickup having an inlet in said body of liquid fluid and relatively movable relative thereto.

14. The heat management system of claim 13 wherein said establishing means interconnects said inlet and said second heat exchanger and provides a fluid return from said second heat exchanger to said drum without passing through said first heat exchanger.

15. A heat management system for use in spacecraft or the like comprising a first heat exchanger of the radiative type for radiating heat into space;
- a second heat exchanger for transferring heat from a variable heat load on a spacecraft;
- means for establishing a heat exchange fluid flow path between said heat exchangers;
- means for regulating fluid flow in said flow path; and
- a pump forming part of said flow path comprising a rotary drum driven about and axis at sufficient speed to cause fluid therein in the liquid phase to move radially outwardly and form and annular body of liquid fluid surrounding a body of gaseous fluid with said drum, and a liquid pickup having an inlet in said body of liquid fluid and relatively movable relative thereto, a mixer for mixing fluid in the gaseous phase with fluid in the liquid phase, and said establishing means providing gaseous and liquid phase fluid to said mixer and mixed fluid from said mixer to said first heat exchanger, and further interconnecting said first heat exchanger and said pump.

16. A heat management system comprising:
- a first heat exchanger being adapted to be in heat exchange relation with a sink having a widely varying temperature;
- a second heat exchanger adapted to be in heat exchange relation with a variable heat load;
- and equilbrating means for maintaining respective bodies of heat exchange fluid in the liquid state and in the gaseous state;
- first flow path means for circulating a mixture of liquid phase fluid and gaseous phase fluid from said equilbrating means to said first heat exchanger and returning fluid from said first heat exchanger to said equilbrating means; and
- second flow path means for circulating liquid phase fluid and from said equilbrating means to said second heat exchanger and for returning fluid therefrom to said equilbrating means said second heat exchanger being and evaporator and further including means for maintaining said equilbrating means at substantially constant pressure.

* * * * *